United States Patent
Rao et al.

(10) Patent No.: US 11,573,445 B2
(45) Date of Patent: Feb. 7, 2023

(54) OFF-AXIS PIXEL DESIGN FOR LIQUID CRYSTAL DISPLAY DEVICES

(71) Applicant: Meta Platforms Technologies, LLC, Menlo Park, CA (US)

(72) Inventors: Linghui Rao, Bothell, WA (US); Samara Kate Sytsma, Kirkland, WA (US); Jacques Gollier, Sammamish, WA (US); Agnes Lee, Saratoga, CA (US); Fenglin Peng, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/371,840

(22) Filed: Jul. 9, 2021

(65) Prior Publication Data
US 2023/0011408 A1    Jan. 12, 2023

(51) Int. Cl.
*G02F 1/1335*    (2006.01)
(52) U.S. Cl.
CPC .............................. *G02F 1/133512* (2013.01)
(58) Field of Classification Search
None
See application file for complete search history.

(56) References Cited

U.S. PATENT DOCUMENTS

| | | | |
|---|---|---|---|
| 5,905,553 A * | 5/1999 | Matsukawa | G02F 1/133512 349/110 |
| 2014/0049944 A1 | 2/2014 | Niioka et al. | |
| 2014/0091990 A1 | 4/2014 | Chang | |
| 2016/0377912 A1 * | 12/2016 | Sumiya | G02F 1/133512 349/110 |
| 2017/0337863 A1 * | 11/2017 | Chang | G09G 3/3225 |
| 2018/0097203 A1 | 4/2018 | Jang et al. | |
| 2020/0110293 A1 * | 4/2020 | Yoshida | G02F 1/133305 |

FOREIGN PATENT DOCUMENTS

WO    WO-2017057387 A1 *    4/2017

OTHER PUBLICATIONS

International Search Report and Written Opinion for International Application PCT/US2022/036053, dated Sep. 19, 2022, 9 pages.

* cited by examiner

*Primary Examiner* — Shan Liu
(74) *Attorney, Agent, or Firm* — Fenwick & West LLP

(57) ABSTRACT

A display device includes a plurality of pixels arranged across a display area of a display device, and a black matrix configured to block a portion of light outputted by each pixel of the plurality of pixels. The black matrix is configured to allow light from the second pixel having a first output intensity distribution having a peak intensity corresponding to a first direction to pass through, and to allow light from the first pixel having a second output intensity distribution having a peak intensity corresponding to a second direction to pass through.

13 Claims, 17 Drawing Sheets

OFF-AXIS PIXEL DESIGN FOR LIQUID CRYSTAL DISPLAY DEVICES

FIELD OF THE INVENTION

This disclosure relates generally to display devices, and more specifically to improving a viewing angle of a display device.

BACKGROUND

Certain types of display devices have limited viewing angles. For example, certain types of display devices suffer from a decrease in brightness or a shift in color as the viewing angle increases. Moreover, as the size of the display device increase, or as the viewing distance of a display device decreases, the difference in viewing angle at which a person views different portions of the display device increases. That is, as the size of the display device increases, the angle at which a person views a pixel located near the edge of the display device compared to the angle at which the person views a pixel located near the center of the display device increases. Similarly, as the viewing distance of the display device decreases, the angle at which a person views a pixel located near the edge of the display device compared to the angle at which the person views a pixel located near the center of the display device increases. This may result in a reduction in quality of the images observed by the viewer.

SUMMARY

Embodiments relate to a display device having improved viewing angles. In one or more embodiments, a display device includes a plurality of pixels arranged across a display area of a display device, and a black matrix configured to block a portion of light outputted by each pixel of the plurality of pixels. Each pixel has a front surface through which light is outputted. The front surface of each pixel has a first region and a second region. The first region of the front surface of a pixel outputs light having a first intensity distribution with a peak intensity corresponding to a first direction. The second region of the front surface of a pixel outputs light having a second intensity distribution with a peak intensity corresponding to a second direction different than the first direction. The black matrix is configured to allow light having a first output intensity distribution having a peak intensity corresponding to the first direction from the second pixel to pass through, and to allow light having a second output intensity distribution having a peak intensity corresponding to the second direction from the first pixel to pass through In some embodiments, the black matrix includes a first opening corresponding to a first pixel of the display device and a second opening corresponding to a second pixel of the display device. The black matrix is configured to block light outputted through a first side of the first pixel, and the first black matrix opening is configured to allow light outputted through a second side of the first pixel to pass through. Moreover, the black matrix is configured to block light outputted through the second side of the second pixel, and the second black matrix opening is configured to allow light outputted through the first side of the second pixel to pass through.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
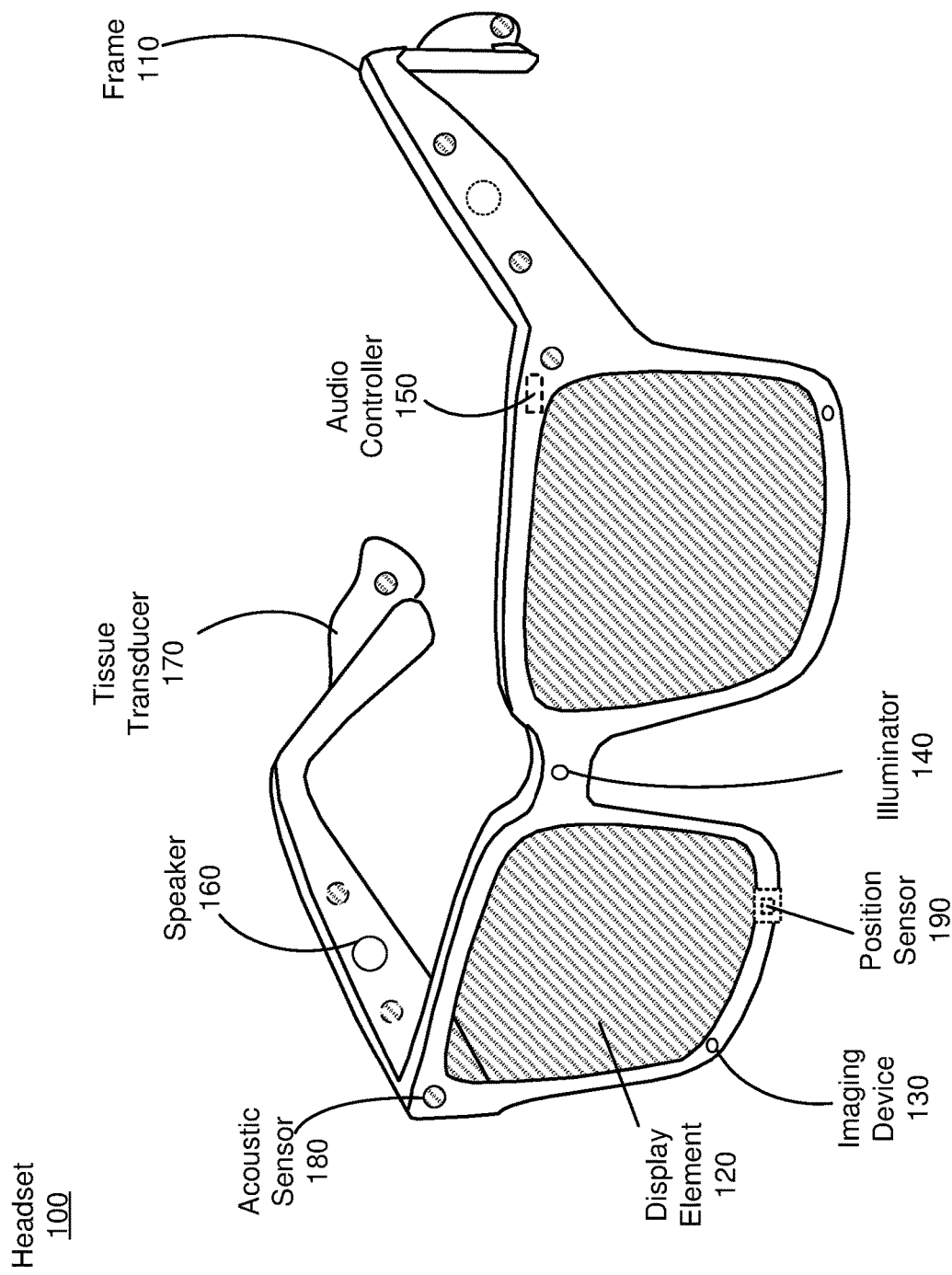
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
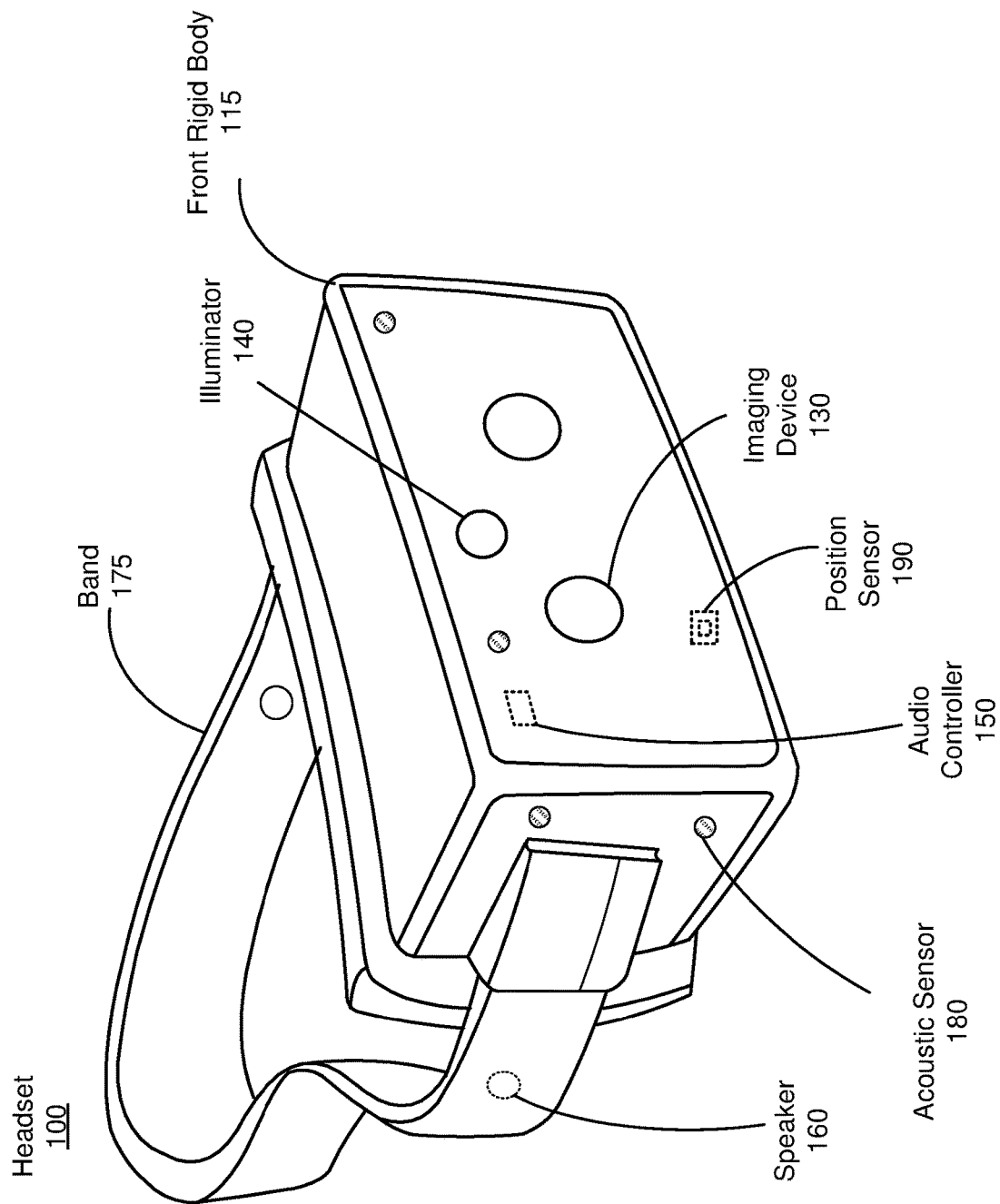
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 1C:
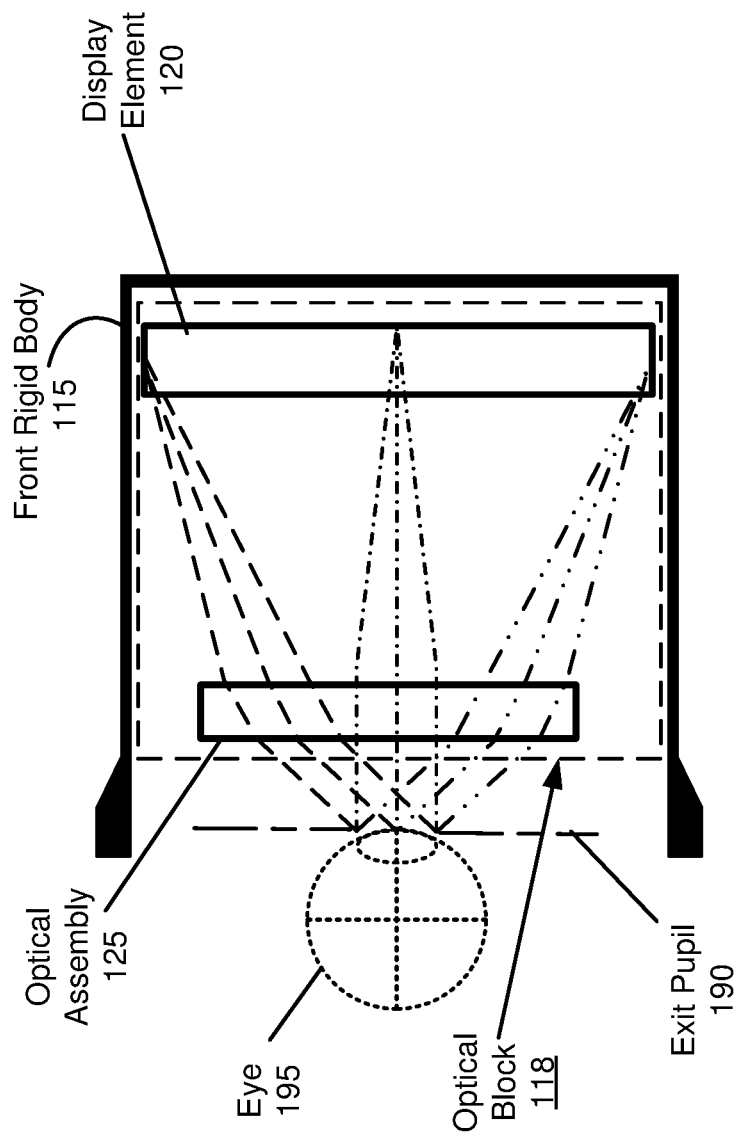
FIG. 1C is a cross section of the front rigid body of the head-mounted display shown in FIG. 1B.

FIG. 1C is a cross section of the front rigid body 115 of the head-mounted display shown in FIG. 1B. As shown in FIG. 1C, the front rigid body 115 includes an optical block 118 that provides altered image light to an exit pupil 190. The exit pupil 190 is the location of the front rigid body 115 where a user's eye 195 is positioned. For purposes of illustration, FIG. 1C shows a cross section associated with a single eye 195, but another optical block, separate from the optical block 118, provides altered image light to another eye of the user.

The optical block 118 includes a display element 120, and the optics block 125. The display element 120 emits image light toward the optics block 125. The optics block 125 magnifies the image light, and in some embodiments, also corrects for one or more additional optical errors (e.g., distortion, astigmatism, etc.). The optics block 125 directs the image light to the exit pupil 190 for presentation to the user.

System Architecture

Figure 2A:
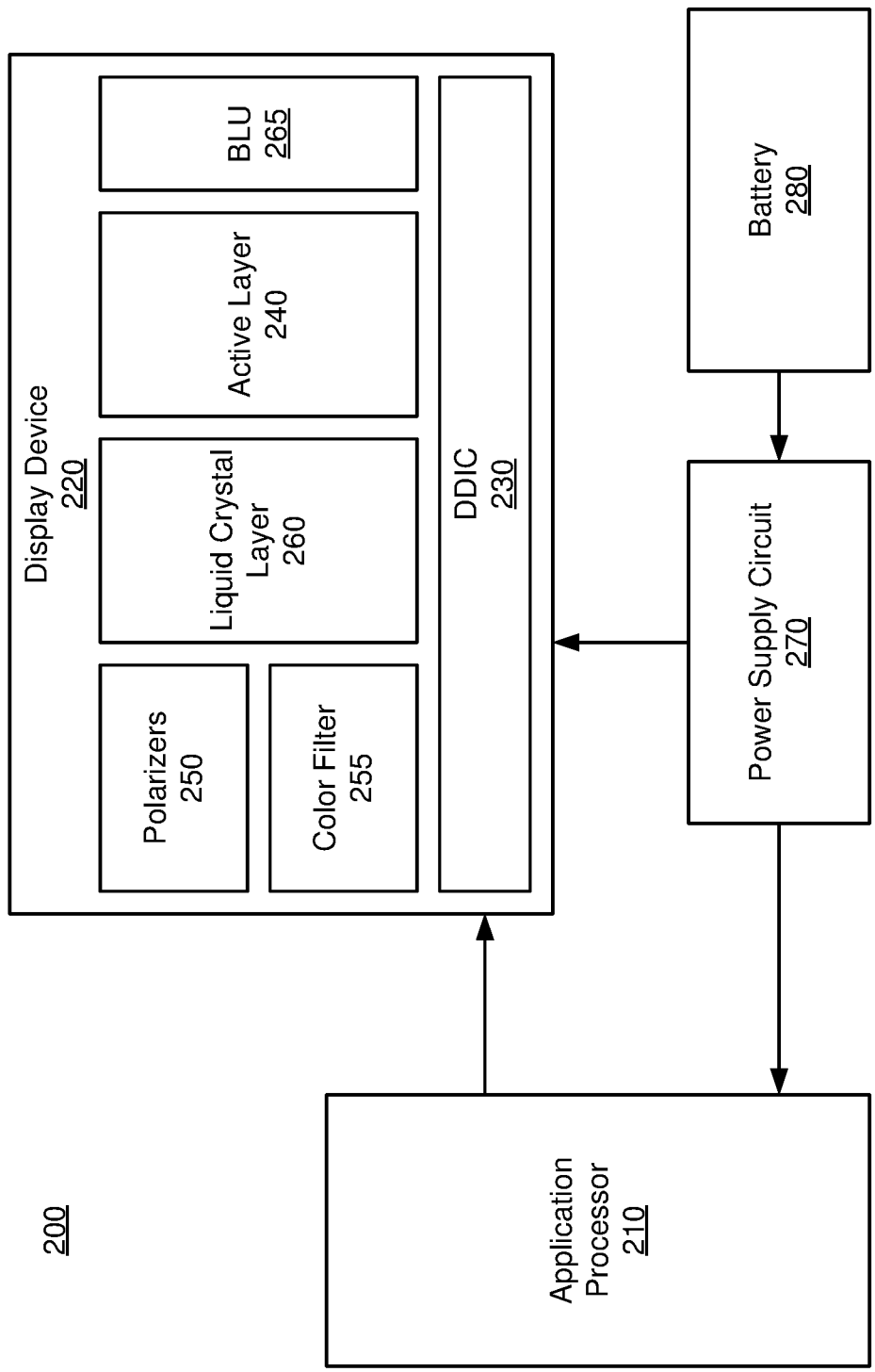
FIG. 2A illustrates a block diagram of an electronic display environment, in accordance with one or more embodiments.

FIG. 2A illustrates a block diagram of an electronic display environment 200, in accordance with one or more embodiments. The electronic display environment 200 includes an application processor 210, and a display device 220. In some embodiments, the electronic display environment 200 additionally includes a power supply circuit 270 for providing electrical power to the application processor 210 and the display device 220. In some embodiments, the power supply circuit 270 receives electrical power from a battery 280. In other embodiments, the power supply circuit 270 receives power from an electrical outlet.

The application processor 210 generates display data for controlling the display device to display a desired image. The display data include multiple pixel data, each for controlling one pixel of the display device to emit light with a corresponding intensity. In some embodiments, each pixel data includes sub-pixel data corresponding to different colors (e.g., red, green, and blue). Moreover, in some embodiments, the application processor 210 generates display data for multiple display frames to display a video.

Figure 2B:
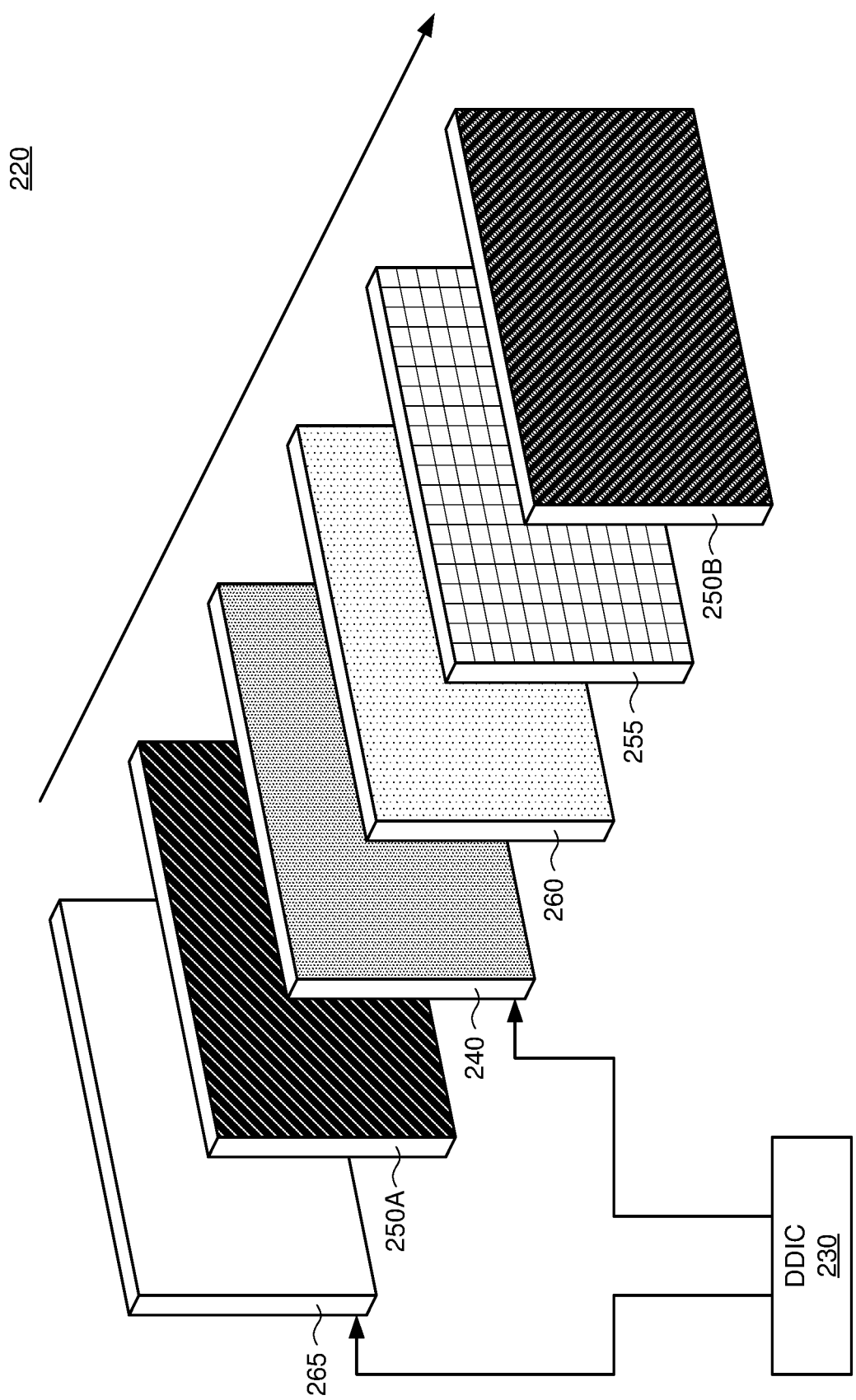
FIG. 2B illustrates a perspective diagram of the elements of the display device, in accordance with one or more embodiments.

The display device 220 includes a display driver integrated circuit (DDIC) 230, an active layer 240, a liquid crystal (LC) layer 260, a backlight unit (BLU) 265, polarizers 250, and a color filter 255. The display device 220 may include additional elements, such as one or more additional sensors. The display device 220 may be part of the HMD 100 in FIG. 1A or FIG. 1B. That is, the display device 220 may be an embodiment of the display element 120 in FIG. 1A or FIG. 1C. FIG. 2B illustrates a perspective diagram of the elements of the display device 220, in accordance with one or more embodiments.

The DDIC 230 receives a display signal from the application processor 210, and generates control signals for controlling each pixel 245 in the active layer 240, and the BLU 265. For example, the DDIC 230 generates signals to program each of the pixels 245 in the active layer 240 according to an image signal received from the application processor 210. Moreover, the DDIC 230 generates one or more signals to turn the BLU 265.

The active layer 240 includes a set of pixels 245 organized in rows and columns. For example, the active layer 240 includes N pixels ($P_{11}$ through $P_{1N}$) in the first row, N pixels ($P_{21}$ through $P_{2N}$) in the second row, N pixels ($P_{31}$ through $P_{3N}$) in the third row, and so on. Each pixel includes sub-pixels, each corresponding to a different color. For example, each pixel includes red, green, and blue sub-pixels. In addition, each pixel may include white sub-pixels. Each sub-pixel includes a thin-film-transistor (TFT) for controlling the liquid crystal in the LC layer 260. For example, the TFT of each sub-pixel is used to control an electric field within a specific area of the LC layer to control the crystal orientation of the liquid crystal within the specific area if the LC layer 260.

The LC layer 260 includes a liquid crystal which has some properties between liquids and solid crystals. In particular, the liquid crystal has molecules that may be oriented in a crystal-like way. The crystal orientation of the molecules of the liquid crystal can be controlled or changed by applying an electric field across the liquid crystal. The liquid crystal may be controlled in different way by applying the electric field in different configurations. Schemes for controlling the liquid crystal includes twisted noematic (TN), in-plane switching (IPS), plane line switching (PLS), fringe field switching (FFS), vertical alignment (VA), etc.

Each pixel 245 is controlled to provide a light output that corresponds to the display signal received from the application processor 210. For instance, in the case of an LCD panel, the active layer 240 includes an array of liquid crystal cells with a controllable polarizations state that can be modified to control an amount of light that can pass through the cell.

The BLU 265 includes light sources that are turned on at predetermined time periods to generate light that can pass through each of the liquid crystal cell to produce a picture for display by the display device. The light sources of the BLU 265 illuminate light towards the array of liquid crystal cells in the active layer 240 and the array of liquid crystal cells controls an amount and location of light passing through the active layer 240. In some embodiments, the BLU 265 includes multiple segmented backlight units, each segmented backlight unit providing light sources for a specific region or zone of the active layer 240.

The polarizers 250 filter the light outputted by the BLU 265 based on the polarization of the light. The polarizers 250 may include a back polarizer 250A and a front polarizer 250B. The back polarizer 250A filters the light outputted by the BLU 265 to provide a polarized light to the LC layer 260. The front polarizer 250B filters the light outputted by the LC layer 260. Since the light provided to the LC layer 260 is polarized by the back polarizer 250A, the LC layer controls an amount of filtering of the front polarizer 250B by adjusting the polarization of the light outputted by the back polarizer 250A.

The color filter 255 filters the light outputted by the LC layer 260 based on color. For instance, the BLU 265 generates white light and the color filter 255 filters the white light to output either red, green, or blue light. The color filter 255 may include a grid of red color filters, green color filters, and blue color filters. In some embodiments, the elements of the display device 220 are arranged in a different order. For example, the color filter may be placed between the BLU 265 and the back polarizer 250A, between the back polarizer 250A and the LC layer 260, or after the front polarizer 250B.

Figure 2C:
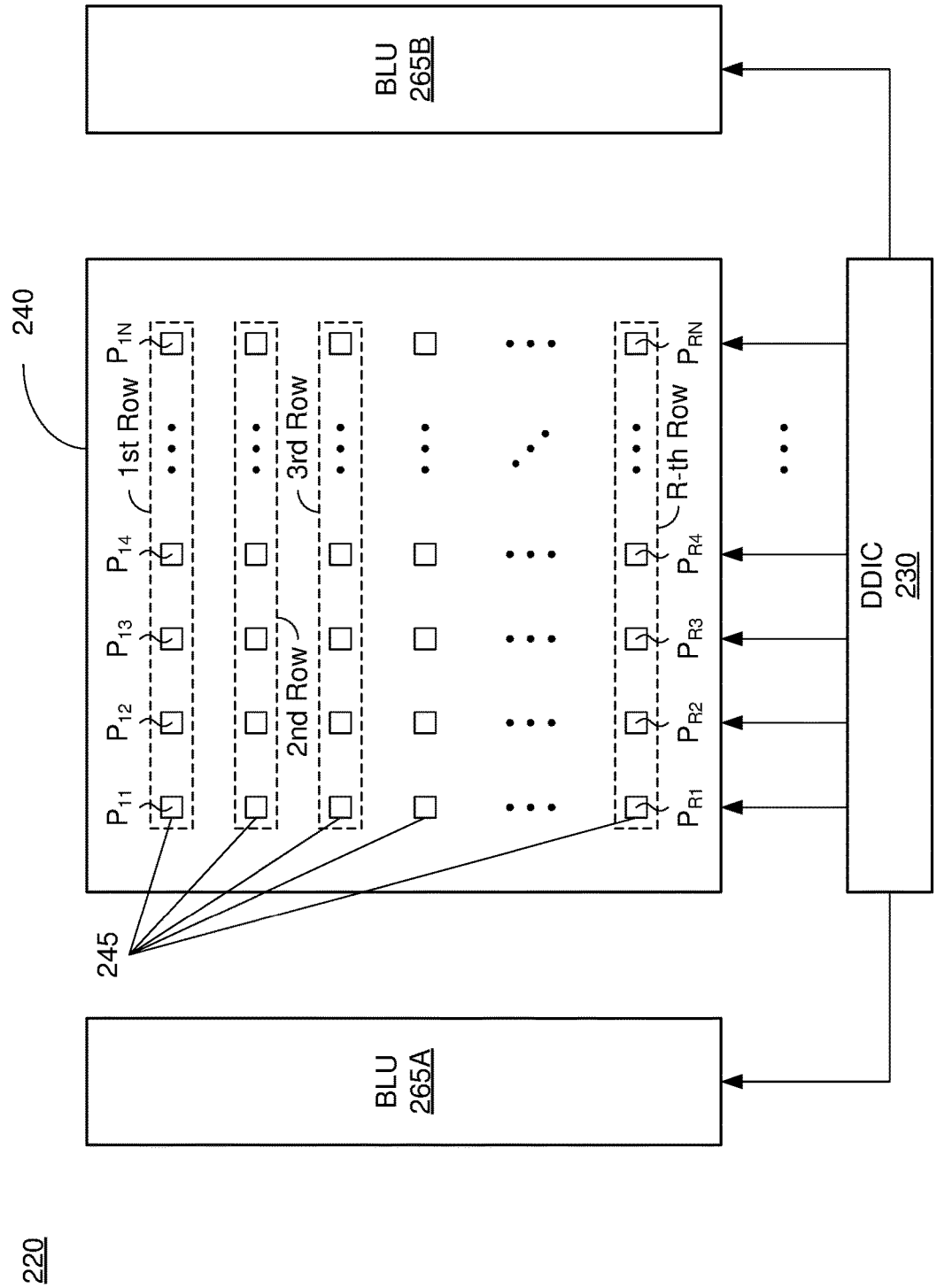
FIG. 2C illustrates an example display device with a two-dimensional array of illumination elements or LC-based pixels, in accordance with one or more embodiments.

FIG. 2C illustrates an example display device 220 with a two-dimensional array of illumination elements or LC-based pixels 245, in accordance with one or more embodiments. In one embodiment, the display device 220 may display a plurality of frames of video content based on a global illumination where all the pixels 245 simultaneously illuminate image light for each frame. In an alternate embodiment, the display device 220 may display video content based on a segmented illumination where all pixels 245 in each segment of the display device 220 simultaneously illuminate image light for each frame of the video content. For example, each segment of the display device 220 may include at least one row of pixels 245 in the display device 220, as shown in FIG. 2C. In the illustrative case where each segment of the display device 220 for illumination includes one row of pixels 245, the segmented illumination can be referred to as a rolling illumination. For the rolling illumination, all pixels 245 in a first row of the display device 220 simultaneously illuminate image light in a first time instant; all pixels 245 in a second row of the display device 220 simultaneously illuminate image light in a second time instant consecutive to the first time instant; all pixels 245 in a third row of the display device 220 simultaneously illuminate image light in a third time instant consecutive to the second time instant, and so on. Other orders of illumination of rows and segments of the display device 220 are also supported in the present disclosure. In yet another embodiment, the display device 220 may display video content based on a controllable illumination where all pixels 245 in a portion of the display device 220 of a controllable size (not shown in FIG. 2C) simultaneously illuminate image light for each frame of the video content. The controllable portion of the display device 220 can be rectangular, square or of some other suitable shape. In some embodiments, a size of the controllable portion of the display device 220 can be a dynamic function of a frame number.

Off-Axis Display Embodiments

Figure 3A:
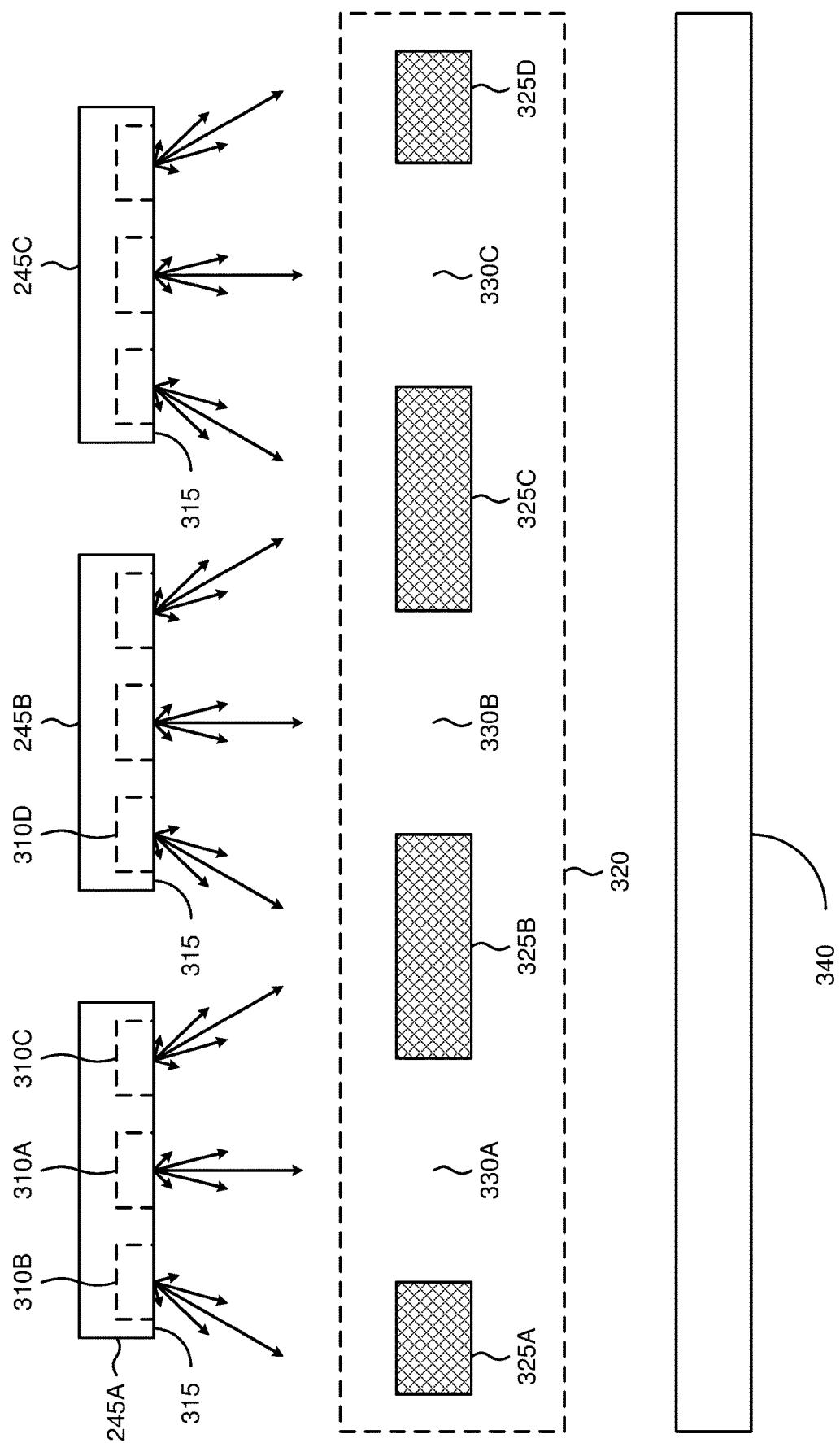
FIG. 3A is a block diagram illustrating the light output of each pixel element of a display device, according to one embodiment.

FIG. 3A is a block diagram illustrating the light output of each pixel element of a display device, according to one embodiment. Each pixel 245 is configured to output light through a front surface 315. Each portion of the front surface 315 of a pixel 245 outputs light with different intensity and at different angles. In some embodiments, at each region of the front surface 315 of a pixel 245, the pixel outputs light having an intensity distribution centered at a specific angle (e.g., a light intensity distribution having a peak brightness corresponding to the specific angle). For example, at region 310A (near the center of the pixel), pixel 245A outputs light having an intensity distribution centered at a direction perpendicular to the front surface 340 of the display panel. Moreover, at region 310B (to the left of the central region 310A of the pixel), pixel 245A outputs light having an intensity distribution centered at a direction angled to the left with respect to the front surface 340 of the display panel. Similarly, at region 310C (to the right of the central region 310A of the pixel), the pixel 245A outputs light having an intensity distribution centered at a direction angled to the right with respect to the front surface 320 of the display panel.

The display panel further includes a black matrix 320. The black matrix 320 is configured to block at least a portion of the light outputted by each pixel 245. In some embodiments, the black matrix 320 includes a set of black matrix elements 325. Each black matrix element 325 is configured to block at least a portion of the light outputted by one or more pixels 245. For example, in the diagram of FIG. 3A, black matrix element 325A is configured to block at least a portion of the light emitted through region 310B of pixel 245A and black matrix element 325B is configured to block at least a portion of the light emitted through region 310C of pixel 245A. In some embodiments, a black matrix element 325 is configured to block at least a portion of the light outputted by multiple pixels 245. For example, in the diagram of FIG. 3A, the black matrix element 325B is configured to block at least a portion of the light outputted through region 310C of the first pixel 245A and at least a portion of the light outputted through region 310D of the second pixel 245B.

The black matrix 320 includes a set of openings 330. Each opening is configured to allow a portion of the light outputted by a corresponding pixel to pass through the black matrix 320. For example, the black matrix 320 includes a first opening 330A corresponding to a first pixel 245A. The first opening 330A allows a portion of the light outputted by the first pixel 245A to pass through the black matrix 320. In some embodiments, the black matrix 320 is configured to block the light outputted by other pixels 245B and 245C such that the light outputted by the other pixels do not pass through the first opening 330A corresponding to the first pixel 245A.

Figure 3B:
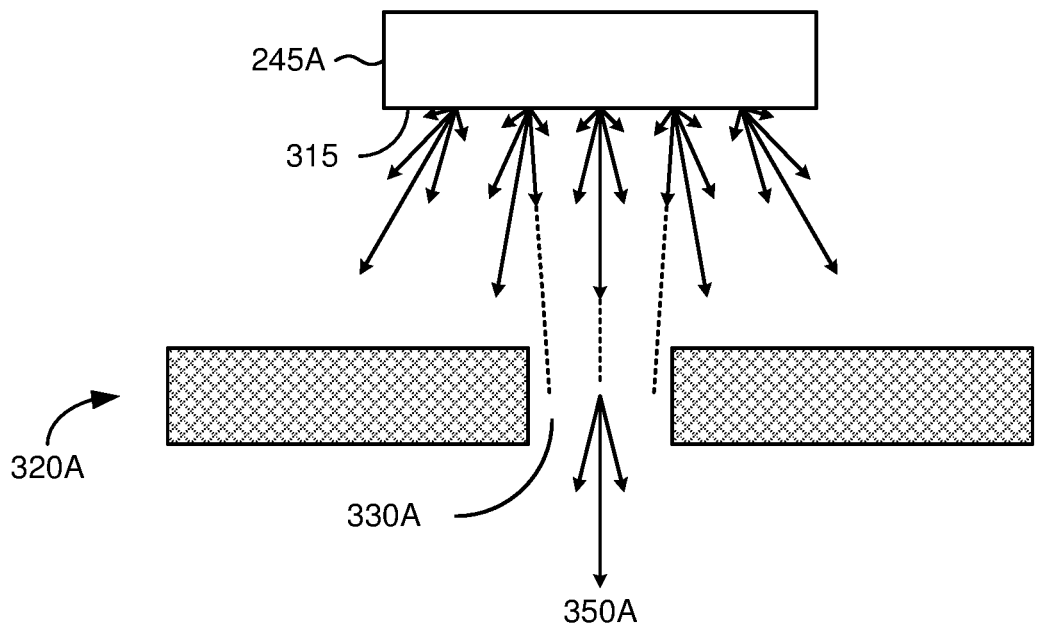
FIG. 3B illustrates a block diagram of a black matrix that lets light having an intensity distribution centered at a direction perpendicular to the front surface of the black matrix to pass through, according to one or more embodiments.
Figure 3C:
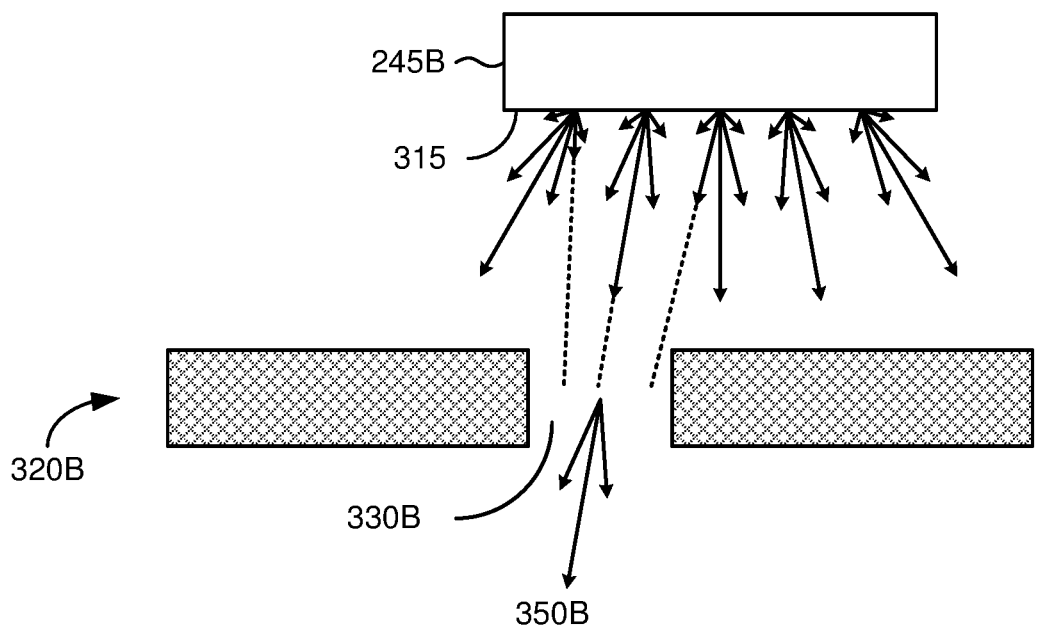
FIG. 3C illustrates a block diagram of a black matrix that lets light having an intensity distribution centered at a direction angled to the left with respect to a front surface of the black matrix to pass through, according to one or more embodiments.

In some embodiments, the opening of the black matrix 320 is positioned to control the angle of the light that is allowed to pass through the black matrix 320. FIG. 3B illustrates a block diagram of a black matrix 320A that lets light having an intensity distribution 350A centered at a direction perpendicular to the front surface of the black matrix to pass through, according to one or more embodiments. FIG. 3C illustrates a block diagram of a black matrix 320B that lets light having an intensity distribution 350B centered at a direction angled to the left with respect to a front surface of the black matrix to pass through, according to one or more embodiments.

In the embodiment of FIG. 3B, the opening 330A of the black matrix 320A is aligned with the center of the pixel 245A. The black matrix 320A blocks a light that is outputted through the sides of the front surface 315 of the pixel 245A, and lets a substantial portion of the light that is outputted through the center of the pixel 245A to pass. Thus, the light that passes through the black matrix 320A has an intensity distribution 350A that is centered at a direction perpendicular to the front surface of the black matrix 320A.

In contrast, in the embodiment of FIG. 3C, the opening 330B of the black matrix 320B is offset from the center of the pixel 245B. As a result, the light that passes through the black matrix 320B has an intensity distribution 350B that is centered at direction angled to the left with respect to a front surface of the black matrix 320B.

In some embodiment, the direction of the center of the intensity distribution is controlled by an amount of offset of the opening 330 of the black matrix. For example, the direction of the peak of the intensity distribution is controlled be angled to the left by offsetting the opening 330 of the black matrix 320 to the left of the center of the pixel 245. Similarly, the direction of the peak of the intensity distribution is controlled be angled to the right by offsetting the opening 330 of the black matrix 320 to the right of the center of the pixel 245.

Figure 4A:
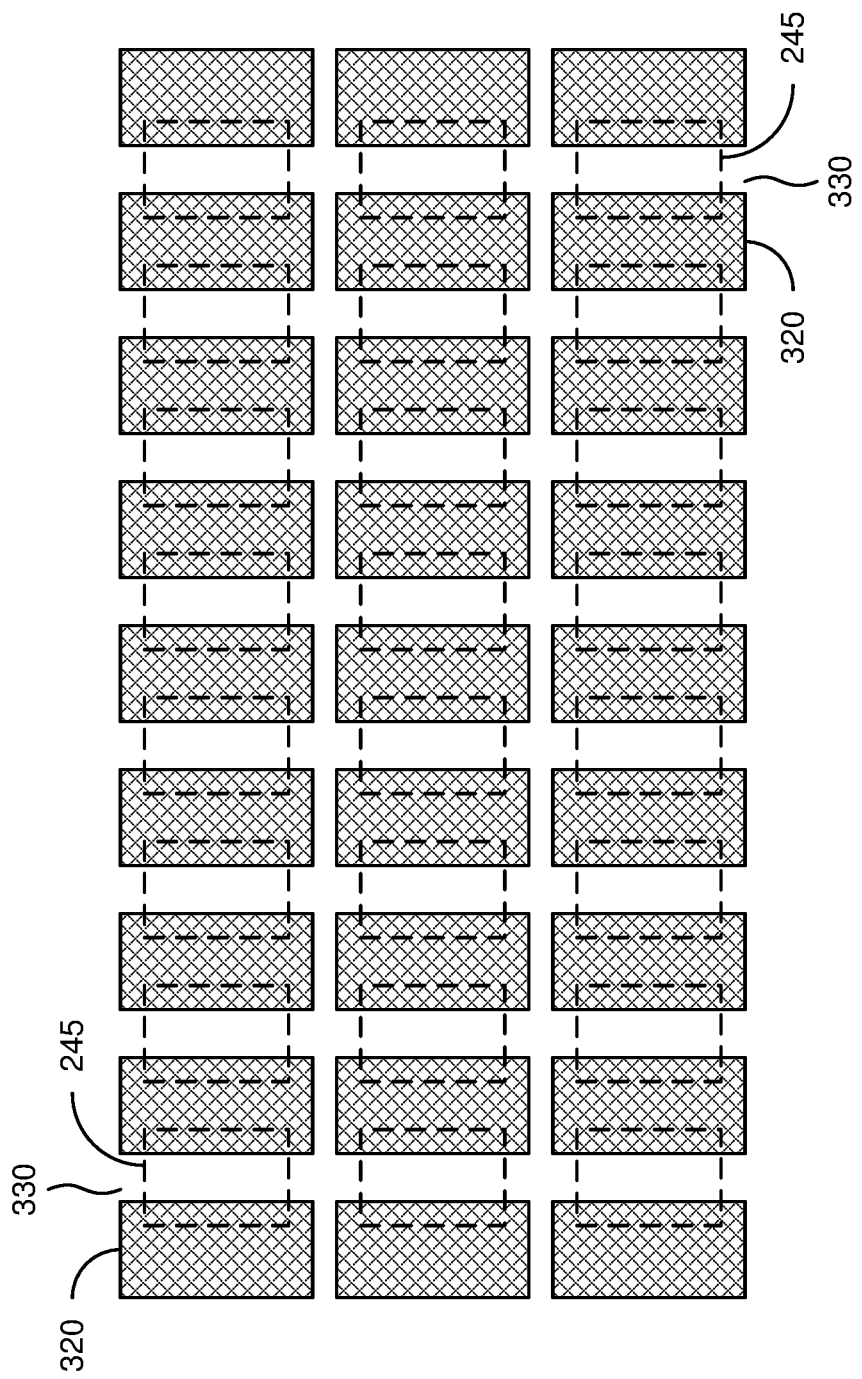
FIG. 4A is a block diagram of a black matrix having a regular structure with openings aligned to the center of pixels, according to one or more embodiments.
Figure 4B:
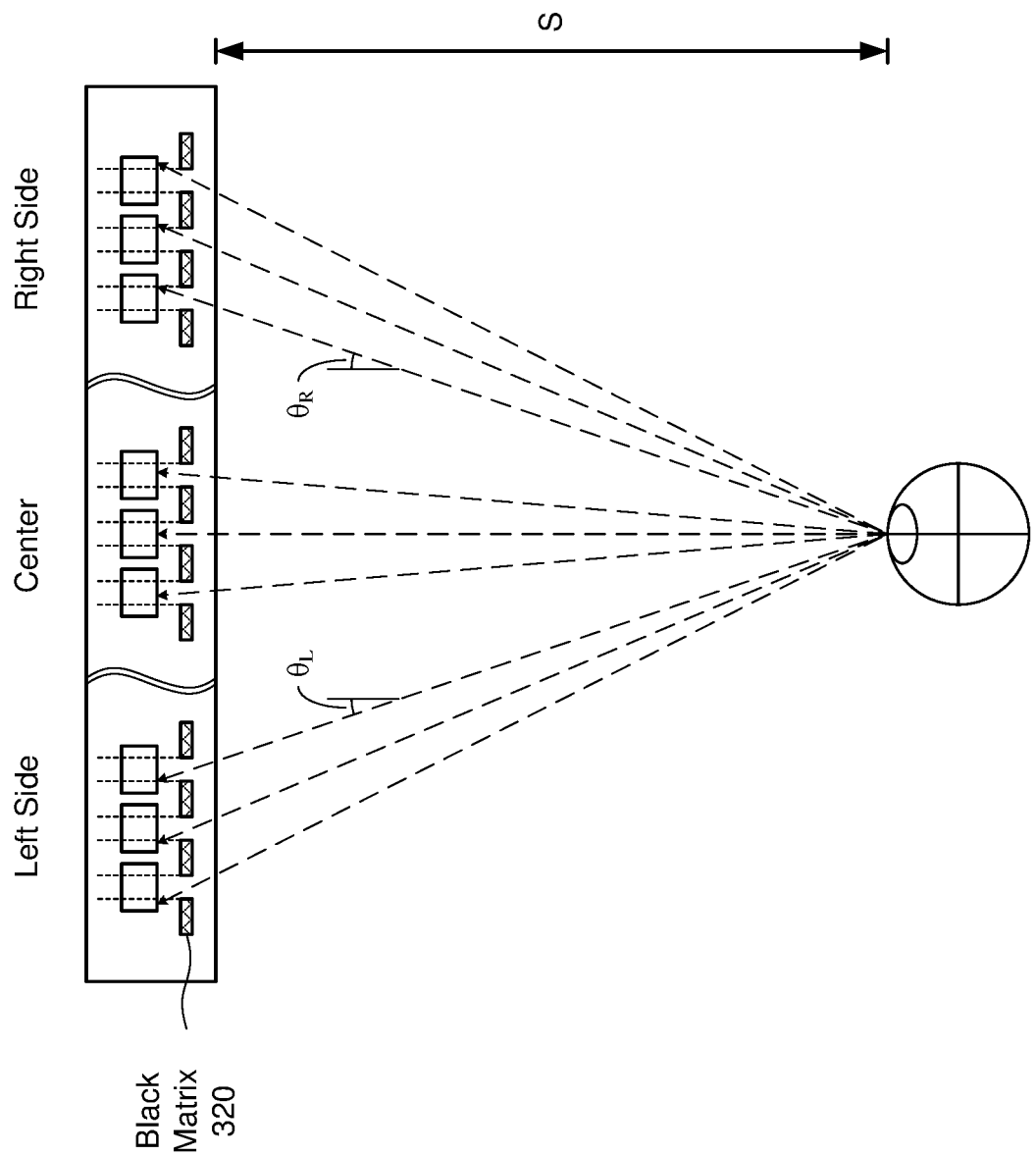
FIG. 4B is a block diagram illustrating a viewing angle for pixels in a display panel with an evenly spaced back matrix, according to one or more embodiments.
Figure 4C:
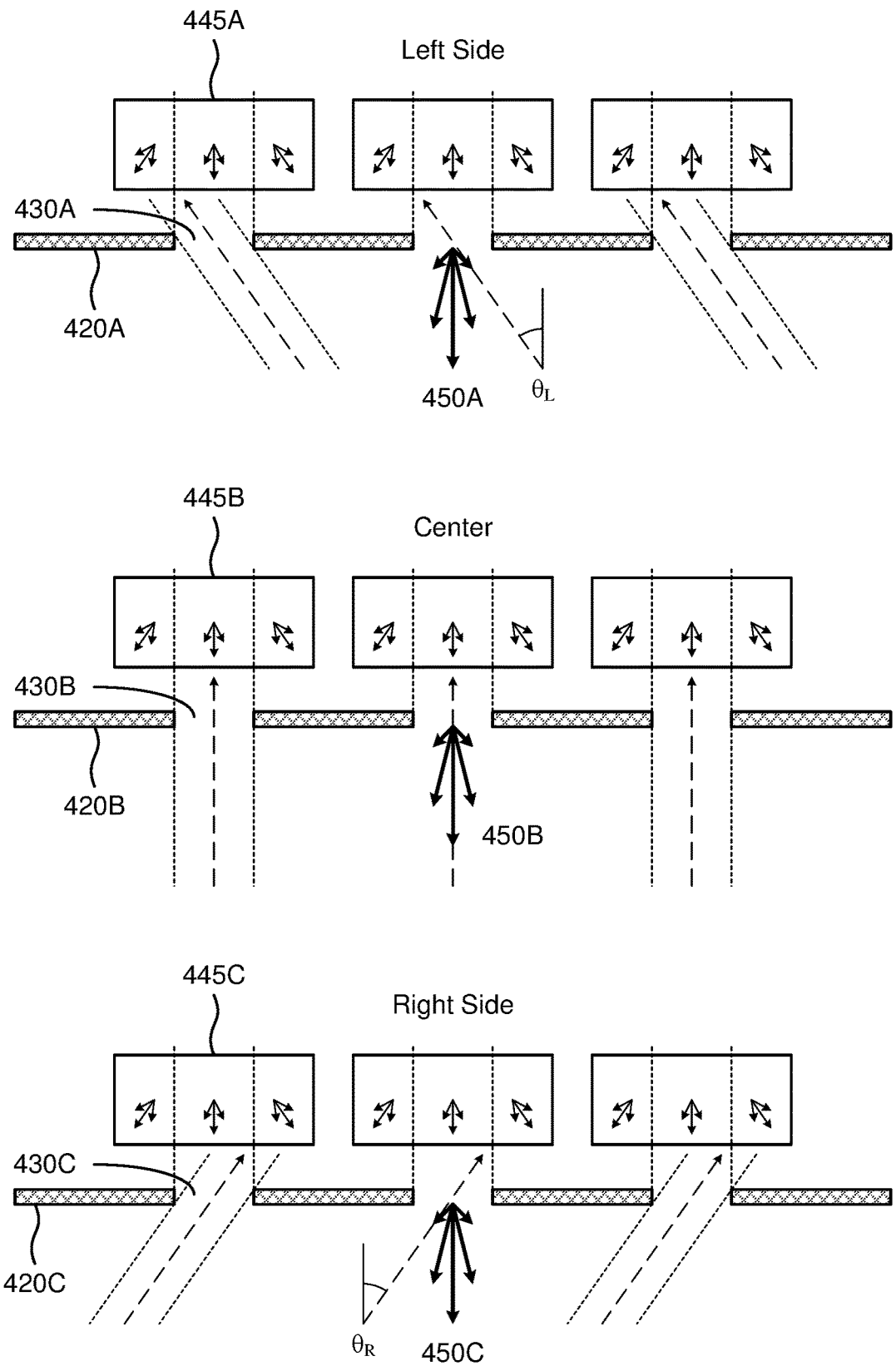
FIG. 4C illustrates a zoomed in version of portion of the display panel shown in FIG. 4B, according to one or more embodiments.

FIG. 4A is a block diagram of a black matrix 330 having a regular structure with openings aligned to the center of pixels 245, according to one or more embodiments. FIG. 4B is a block diagram illustrating a viewing angle for pixels in a display panel 220 with an evenly spaced back matrix, according to one or more embodiments. FIG. 4C illustrates a zoomed in version of portion of the display panel shown in FIG. 4B, according to one or more embodiments.

As shown in FIG. 4B, the angle at which a viewer positioned at a distance S from the display device observes each of the pixels varies throughout the display device. For example, the viewer having an eye aligned with the center of the display devices observes the pixels located near the left side of the display device with a first angle $\theta_L$ (e.g., angled to the left with respect to the direction perpendicular to the front surface of the display device), and observes the pixels located near the right side of the display device with a second angle $\theta_R$ (e.g., angled to the right with respect to the direction perpendicular to the front surface of the display device). Moreover, in some embodiments, due to a thickness of the black matrix or a distance between the opening in the black matrix and the source of the light for the pixel, the portion of the pixels that are visible to an observer changes across the display panel 220.

Since the openings 330 of the black matrix are aligned to the center of every pixel 245, as the viewing angle of pixels deviates from the perpendicular direction, the direction of the peak of the intensity distribution of the light outputted by the pixels and that is let through by the black matrix drifts from the viewing angle of the viewer.

As shown in FIGS. 4B and 4C, the openings 430B of the black matrix 420B corresponding to pixels 445B located near the center of the display panel allows the viewer to see light outputted through the center of the pixels. As such, near the center of the display panel, the light that passes through the opening 330 of the black matrix 320 has a distribution 450A centered at an angle perpendicular (or substantially perpendicular) to the front surface of the display panel. As such, the viewer is aligned with the peak of light intensity distribution for the pixels located near the center of the display device.

However, for pixels that are located away from the center of the display device, since the black matrix is also aligned to the center of the pixels, the light that passes through the openings 430 of the black matrix 420 also has a distribution 450 centered at an angle perpendicular (or substantially perpendicular) to the front surface of the display panel. However, since the viewer observes the pixels located away from the center at an angle, the viewing angle of the viewer is not aligned to the peak of the intensity distribution of the light that passes through the openings of the black matrix.

For example, for pixels 445A located in the left side of the display panel, the viewer observes the pixels at an angle $\theta_L$ (angled to the left with respect to the direction perpendicular to front surface of the display device). However, because the black matrix 420A is aligned with the center of the pixels 445A, the light that passes through the black matrix 420A has a distribution 450A centered at an angle perpendicular to the front surface of the display panel. As such, since the angle corresponding to the peak light intensity is different than the viewing angle of the viewer, a large portion of the light that passes through the black matrix 420A does not reach the eyes of the viewer.

In some embodiments, because the viewer is at an angle with respect to pixels that are located off-center, the openings 330A of the black matrix 320A allows the viewer to see the light outputted through a left side of the pixels 245. However, the light intensity distribution of the left side of the pixel 445A is centered at a direction angled to the left, whereas the viewer is viewing the pixels 445A from the right. As such, for the pixels located on the left side of the display panel, the viewing angle of the viewer is not aligned with the angle of the peak of the light intensity distribution of the portions of the pixel that are visible to the viewer.

Similarly, for pixels 445C located in the right side of the display panel, the viewer observes the pixels at an angle $\theta_R$ (angled to the right with respect to the direction perpendicular to front surface of the display device). However, because the black matrix 420C is aligned with the center of the pixel 445C, the light that passes through the black matrix 420C has a distribution 450C centered at an angle perpendicular to the front surface of the display panel. As such, since the angle corresponding to the peak light intensity is different than the viewing angle of the viewer, a large portion of the light that passes through the black matrix 420C does not reach the eyes of the viewer.

In some embodiments, because the viewer is at an angle with respect to pixels that are located off-center, the openings 330A of the black matrix 320A allows the viewer to see the light outputted through a left side of the pixels 245. However, the light intensity distribution of the right side of the pixel 445C is centered at a direction angled to the right, whereas the viewer is viewing the pixel 445C from the left. As such, for the pixels located on the right side of the display panel, the viewing angle of the viewer is not aligned with the angle of the peak of the light intensity distribution of the portions of the pixel that are visible to the viewer.

Figure 5A:
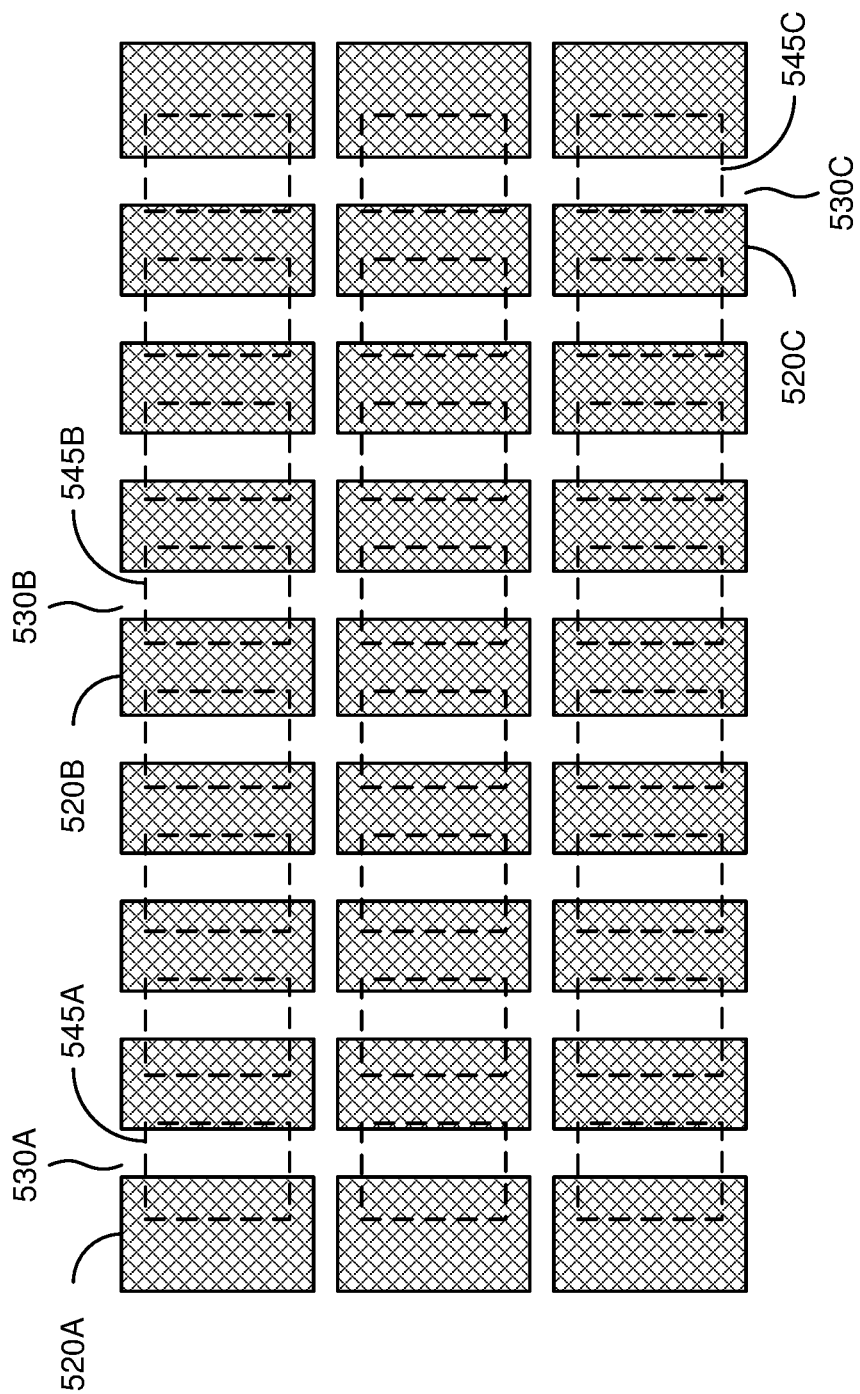
FIG. 5A is a block diagram of a black matrix having an off-axis design, according to one or more embodiments.
Figure 5B:
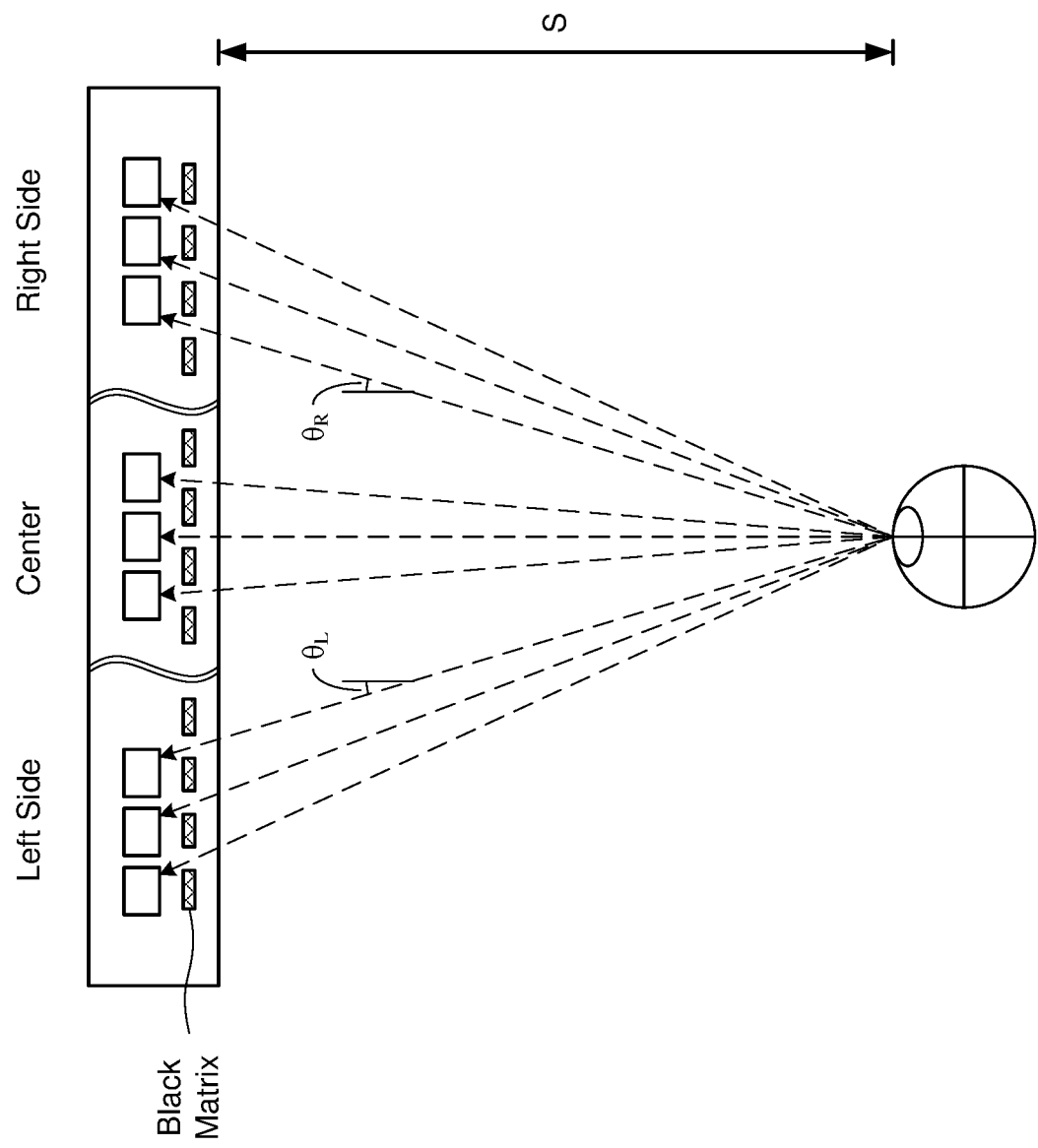
FIG. 5B is a block diagram illustrating a viewing angle for pixels in a display panel having an off-axis back matrix, according to one or more embodiments.
Figure 5C:
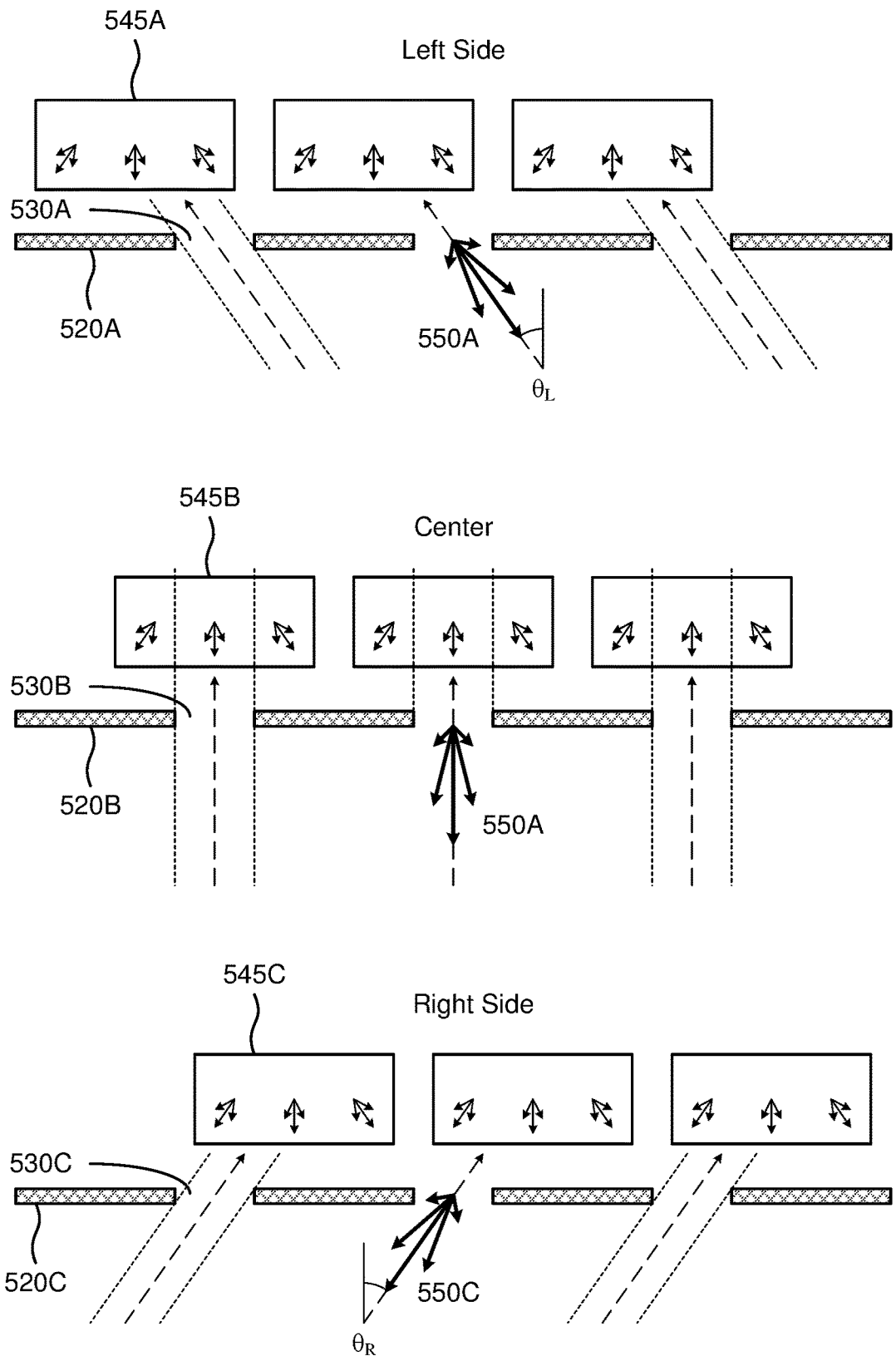
FIG. 5C illustrates a zoomed in version of portion of the display panel shown in FIG. 5B, according to one or more embodiments.

FIG. 5A is a block diagram of a black matrix 330 having an off-axis design, according to one or more embodiments. FIG. 5B is a graph illustrating a viewing angle for pixels in a display panel 220 having an off-axis back matrix, according to one or more embodiments. FIG. 5C illustrates a zoomed in version of portion of the display panel shown in FIG. 5B, according to one or more embodiments.

In the example of FIG. 5A, the openings 530A corresponding to pixels 545A located on the left side of the display panel are shifted towards the right side of the pixels, the openings 530B corresponding to pixels 545B near the center of the display panel are aligned to the center of the pixels, and the openings 530C corresponding to pixels 545C located on the right side of the display panel are shifted towards the left side of the pixels. In some embodiments, the openings corresponding to pixels located on the upper side of the display panel are shifted towards the bottom of the pixels and the openings corresponding to pixels located on the bottom side of the display panel are shifted towards the top of the pixels.

As illustrated in FIGS. 5B and 5C, for pixels 545A located on the left side of the display panel, since the opening 530A of the black matrix 520A is shifted towards the right side of the pixels, the openings 530A allow the viewer to see the light outputted through the right side of the pixels. Since the peak of the intensity distribution for the light outputted through the right side of the pixels is angled to the right, the alignment of the viewing angle of the viewer to the direction of the light outputted by the pixels located on the left side of the display panel is improved.

Similarly, for pixels 545C located on the right side of the display panel, since the opening 530C of the black matrix 520C is shifted towards the left side of the pixels, the openings 530C allow the viewer to see the light outputted through the left side of the pixels. Since the peak of the intensity distribution for the light outputted through the left side of the pixels is angled to the left, the alignment of the viewing angle of the viewer to the direction of the light outputted by the pixels located on the right side of the display panel is also improved.

Figure 5D:
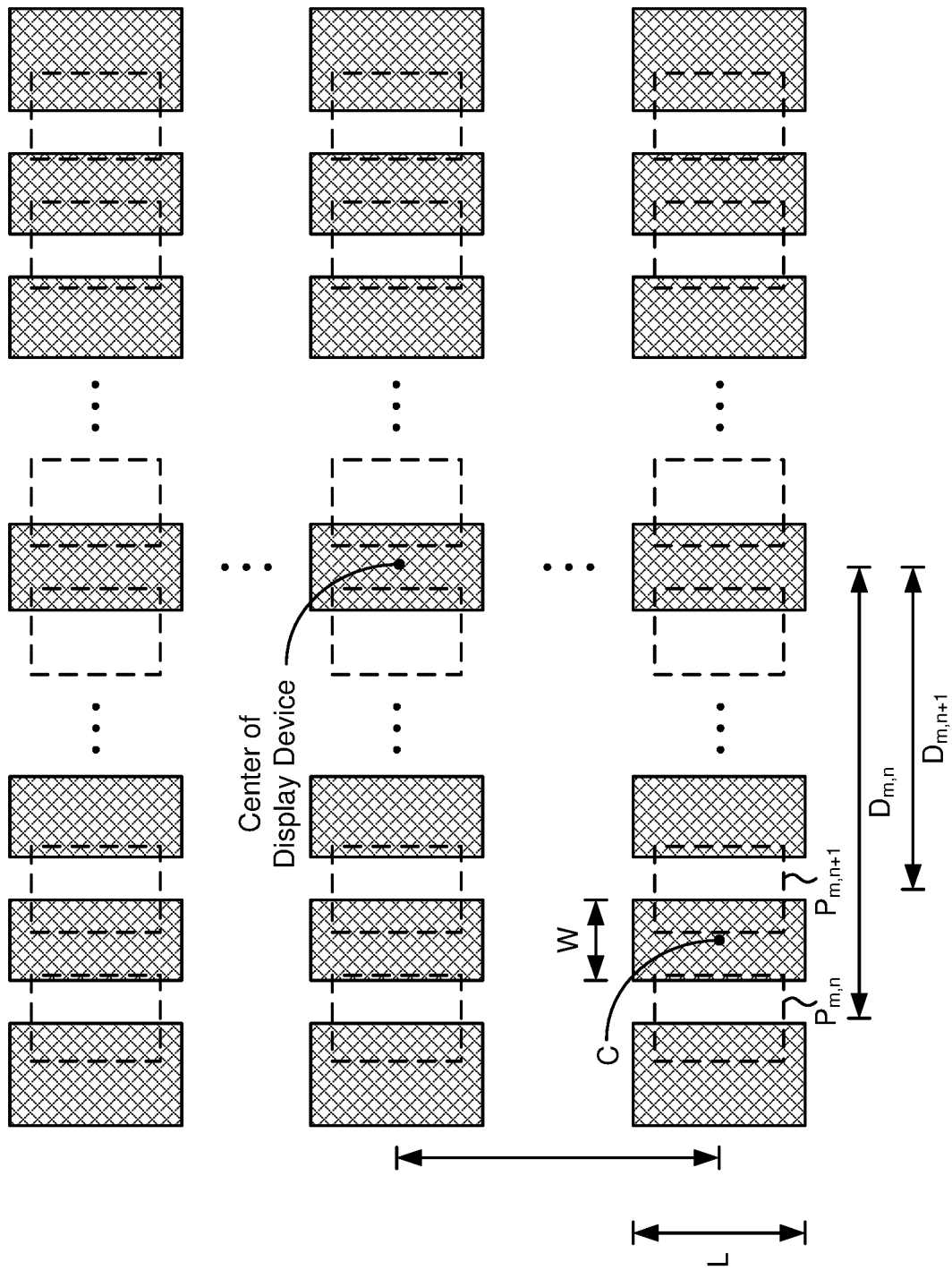
FIG. 5D illustrates a block diagram showing various parameters of black matrix elements and black matrix openings, according to one or more embodiments.

FIG. 5D illustrates a block diagram showing various parameters of black matrix elements and black matrix openings, according to one or more embodiments.

In some embodiments, the shift in the opening of the black matrix are determined based on a distance between the corresponding pixel and the center of the display device. As the distance $D_{mn}$ between the pixel $P_{mn}$ and the center of the display device increases, the shift in the corresponding opening of the black matrix is also increased. In some embodiments, the amount of shift in the black matrix is further determined based on an expected viewing distance for the display panel. For example, for certain uses (such as in a head-mounted display) where the viewing distance is fixed, the shift in the openings of the black matrix is designed based on the distance between the display panel and the eye of the viewer. In some embodiment, for each pixel a viewing angle for the pixel is determined based on the location of the pixel and the expected viewing distance. The location of the opening corresponding to the pixel is then determined based on the determined viewing angle.

In some embodiments, the location and size of each black matrix element is determined based on the position of the black matrix element. For example, a center C, a length L, and a width W for each black matrix element are determined based on the location of corresponding pixels. That is, the center C, length L, and width W for a black matrix element that is configured to block a portion of a pixel $P_{m,n}$ are determined based on the location of the pixel $P_{m,n}$. Moreover, for black matrix elements that are configured to block portions of multiple pixels, the center C, length L, and width W of the black matrix element are determined based on the locations of multiple pixels. That is, the center C, length L, and width W for a black matrix element that is configured to clock a portion of a pixle $P_{m,n}$ and a pixel $P_{m,n+1}$ are determined based on the location of the pixies $P_{m,n}$ and pixel $P_{m,n+1}$.

Backlight with Angular Profile

Figure 6:
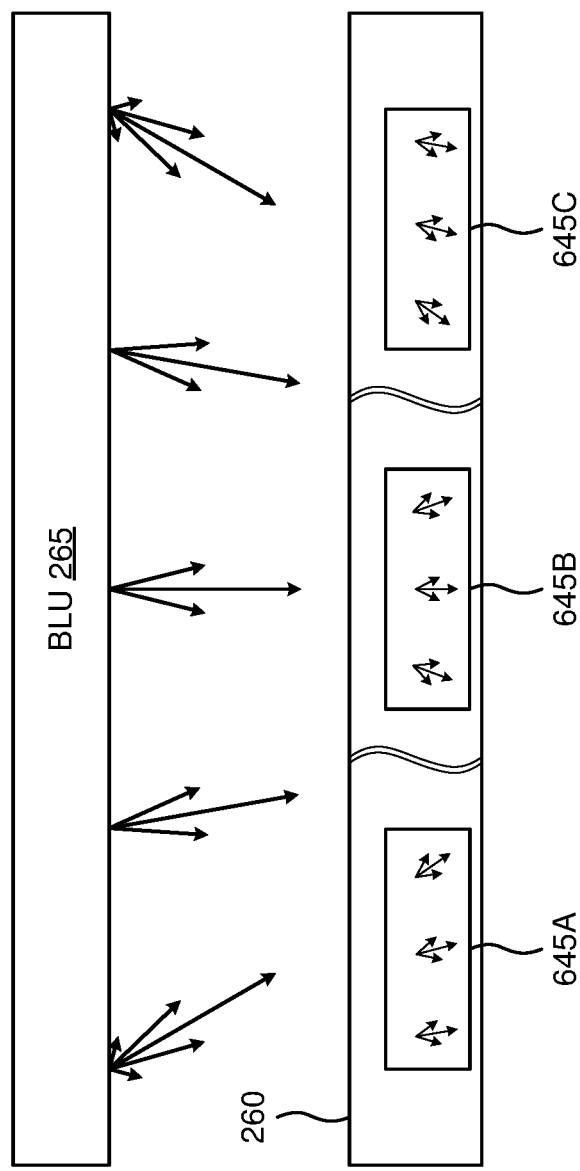
FIG. 6 illustrates a block diagram of display panel having a blacklight unit (BLU) with an angular profile, according to one or more embodiments.

FIG. 6 illustrates a block diagram of display panel having a blacklight unit (BLU) with an angular profile, according to one or more embodiments. The BLU 265 is configured to generate light having a varying light intensity distribution.

In particular, the BLU 265 is designed to output light having a direction that is biased towards the center of the display panel. That is, at sections located on the left side of the display panel, the BLU outputs light having a light intensity distribution with a peak intensity angled towards the right. Similarly, at section located on the right side of the display panel, the BLU outputs light having a light intensity distribution with a peak intensity angled towards the left.

In some embodiments, optical elements are used for controlling the angular profile of the light outputted by the BLU. Backlight units having an angular profile is further described in U.S. patent application Ser. No. 16/744,048, titled "Methods and Apparatus for Controlling Display Angular Profile," filed Jan. 15, 2020, which is hereby incorporate by reference in its entirety.

The light generated by the BLU 265 is provided to the LCD 260. The LCD 260 filters the light received from the BLU 265 and outputs the light corresponding to each of the pixels of the display device. Since the light received by each of the pixels in the LCD 260 has a specific angular profile, each of the pixels output light having a corresponding light intensity distribution.

That is, pixels 645A located on the left side of the display device receive light from the BLU 265 having an intensity distribution having a peak intensity angled to the right. As such, the pixels 645A located on the left side of the display device output light also having an intensity distribution having a peak intensity angled to the right.

Similarly, pixels 645C located on the right side of the display device receive light from the BLU 265 having an intensity distribution having a peak intensity angled to the left. As such, the pixels 645C located on the right side of the display device output light also having an intensity distribution having a peak intensity angled to the left.

Moreover, pixels 645B located near the center of the display device receive light from the BLU 265 having an intensity distribution having a peak intensity at a direction orthogonal to the front surface of the display device. As such, the pixels 645B located near the center of the display panel output light also having an intensity distribution having a peak intensity with a direction orthogonal to the front surface of the display device.

As such, by controlling the angular profile of the BLU, the angular profile of the light outputted by each of the pixels can be controlled, improving the viewing angle of the display device.

System Environment

Figure 7:
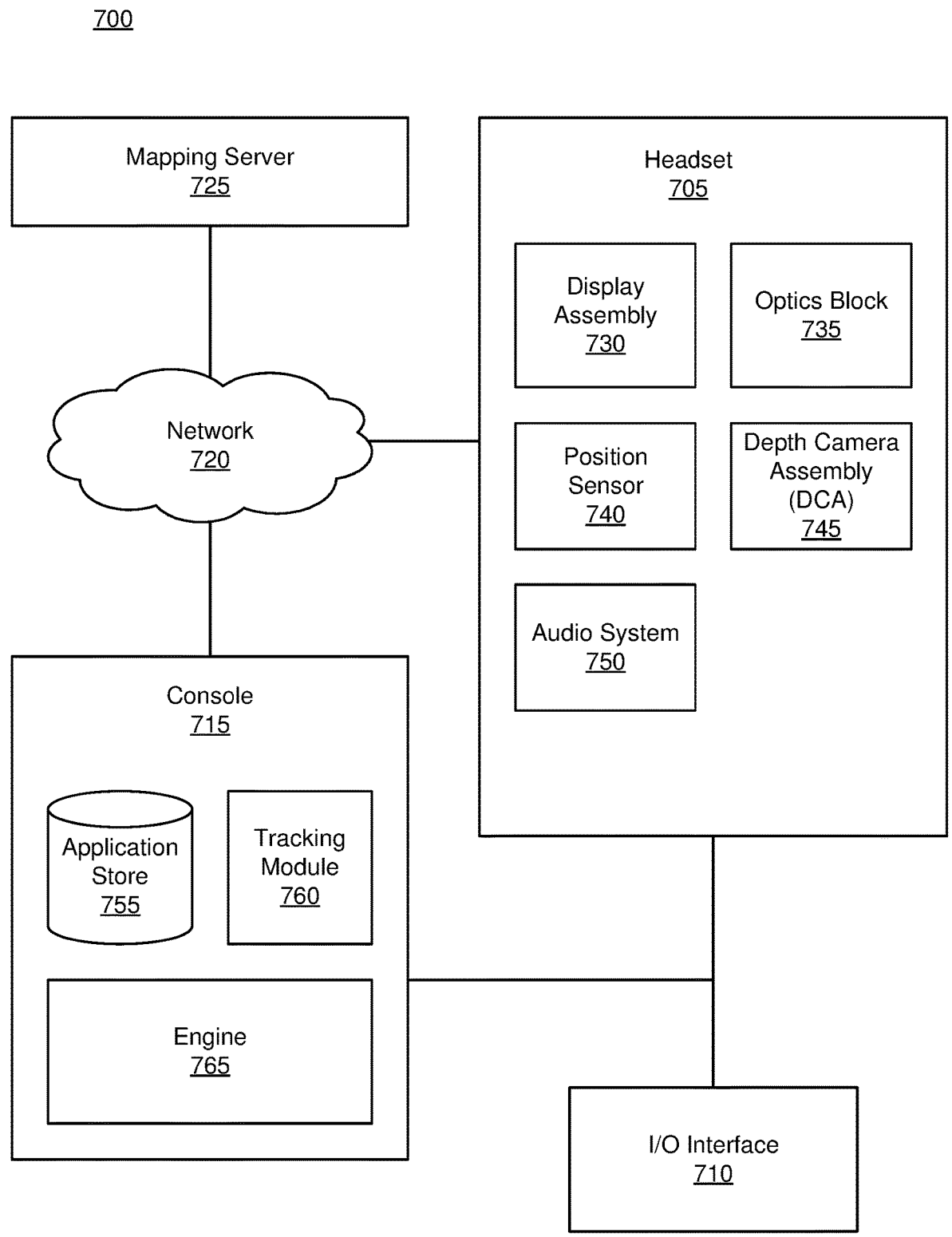
FIG. 7 is a system that includes a headset, in accordance with one or more embodiments.

FIG. 7 is a system 700 that includes a headset 705, in accordance with one or more embodiments. In some embodiments, the headset 705 may be the headset 100 of FIG. 1A or the headset 105 of FIG. 1B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, and the DCA 745. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUS, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1A.

The audio system 750 provides audio content to a user of the headset 705. The audio system 750 is substantially the same as the audio system 200 describe above. The audio system 750 may comprise one or acoustic sensors, one or more transducers, and an audio controller. The audio system 750 may provide spatialized audio content to the user. In some embodiments, the audio system 750 may request acoustic parameters from the mapping server 725 over the network 720. The acoustic parameters describe one or more acoustic properties (e.g., room impulse response, a reverberation time, a reverberation level, etc.) of the local area. The audio system 750 may provide information describing at least a portion of the local area from e.g., the DCA 745 and/or location information for the headset 705 from the position sensor 740. The audio system 750 may generate one or more sound filters using one or more of the acoustic parameters received from the mapping server 725, and use the sound filters to provide audio content to the user.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 725 may include a database that stores a virtual model describing a plurality of spaces, wherein one location in the virtual model corresponds to a current configuration of a local area of the headset 705. The mapping server 725 receives, from the headset 705 via the network 720, information describing at least a portion of the local area and/or location information for the local area. The user may adjust privacy settings to allow or prevent the headset 705 from transmitting information to the mapping server 725. The mapping server 725 determines, based on the received information and/or location information, a location in the virtual model that is associated with the local area of the headset 705. The mapping server 725 determines (e.g., retrieves) one or more acoustic parameters associated with the local area, based in part on the determined location in the virtual model and any acoustic parameters associated with the determined location. The mapping server 725 may transmit the location of the local area and any values of acoustic parameters associated with the local area to the headset 705.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display device comprising:
    a plurality of pixels arranged across a display area of the display device, the plurality of pixels comprising a first pixel and a second pixel closer to a center of the display panel than the first pixel, angles of peak intensities at different regions in the first pixel relative to a direction perpendicular to the first pixel increasing with increase in offset distances from a center of the first pixel, angles of peak intensities at different regions in the second pixel relative to a direction perpendicular to the second pixel increasing with increase in offset distances from a center of the second pixel increases; and
    a black matrix configured to block a portion of light outputted by each of the pixels, the black matrix formed with a first black matrix opening passing through first light from the first pixel, and a second black matrix opening passing through second light from the second pixel,
    wherein the first opening shifted by a first offset distance from the center of the first pixel so that a peak intensity of a portion of the first light from one of the different regions of the first pixel at the first offset distance is in a first direction that coincides with a first viewing angle of a viewer to the first pixel, the second opening shifted by a second offset distance from the center of the second pixel so that a peak intensity of a portion the second light from one of the regions of the second pixel at the second offset distance is in a second direction that coincides with a second viewing angle of the viewer to the second pixel, the first offset distance larger than the second offset distance.

2. The display device of claim 1, wherein a center of the first black matrix opening is off-center with respect to the center of the first pixel towards the center of the display panel.

3. The display device of claim 1, wherein the black matrix further comprises a plurality of black matrix elements including a first black matrix element configured to block at least a portion of the first light, and a second black matrix element configured to block at least a portion of the second light.

4. The display device of claim 3, wherein the first black matrix element is configured to have a length determined based at least on a position of the first pixel, and wherein the second black matrix element is configured to have a length determined based at least on a position of the second pixel.

5. The display device of claim 3, wherein the first black matrix element is configured to have a position determined based at least on a position of the first pixel, and wherein the second black matrix element is configured to have a position determined based at least on a position of the second pixel.

6. The display device of claim 3, wherein the first black matrix element is configured to have an amount of overlap with the first pixel determined based on a position of the first pixel, and wherein the second black matrix element is configured to have an amount of overlap with the second pixel determined based on a position of the second pixel.

7. The display device of claim 3, wherein the plurality of pixels further comprises a third pixel, the third pixel adjacent to the first pixel, wherein the first black matrix element is further configured to block at least a portion of light outputted by the third pixel, and wherein an amount of overlap between the first black matrix element and the first pixel is larger than an amount of overlap between the first black matrix element and the third pixel.

8. A headset comprising a display device, the display device comprising:
    a plurality of pixels arranged across a display area of the display device, the plurality of pixels comprising a first pixel and a second pixel closer to a center of the display panel than the first pixel, angles of peak intensities at different regions in the first pixel relative to a direction perpendicular to the first pixel increasing with increase in offset distances from a center of the first pixel, angles of peak intensities at different regions in the second pixel relative to a direction perpendicular to the second pixel increasing with increase in offset distances from a center of the second pixel increases;
    a black matrix configured to block a portion of light outputted by each of the pixels, the black matrix formed with a first black matrix opening passing through first light from the first pixel, and a second black matrix opening passing through second light from the second pixel,
    wherein the first opening shifted by a first offset distance from the center of the first pixel so that a peak intensity of a portion of the first light from one of the different regions of the first pixel at the first offset distance is in a first direction that coincides with a first viewing angle of a viewer to the first pixel, the second opening shifted by a second offset distance from the center of the second pixel so that a peak intensity of a portion the second light from one of the regions of the second pixel at the second offset distance is in a second direction that coincides with a second viewing angle of the viewer to the second pixel, the first offset distance larger than the second offset distance.

9. The headset of claim 8, wherein a center of the first black matrix opening is off-center with respect to the center of the first pixel towards the center of the display panel.

10. The headset of claim 8, wherein the black matrix further comprises:
    a plurality of black matrix elements including a first black matrix element configured to block at least a portion of the first light, and a second black matrix element configured to block at least a portion of the second light.

11. The headset of claim 10, wherein the first black matrix element is configured to have a length determined based at least on a position of the first pixel, and wherein the second black matrix element is configured to have a length determined based at least on a position of the second pixel, and wherein the first black matrix element is configured to have a position determined based at least on a position of the first pixel, and wherein the second black matrix element is configured to have a position determined based at least on a position of the second pixel.

12. The headset of claim 10, wherein the first black matrix element is configured to have an amount of overlap with the first pixel determined based on a position of the first pixel, and wherein the second black matrix element is configured to have an amount of overlap with the second pixel determined based on a position of the second pixel.

13. The headset of claim 10, wherein the first black matrix element is further configured to block at least a portion of light outputted by a third pixel adjacent to the first pixel, and wherein an amount of overlap between the first black matrix element and the first pixel is configured to be larger than an amount of overlap between the first black matrix element and the third pixel.

* * * * *